United States Patent [19]

Narumi et al.

[11] Patent Number: 5,276,293

[45] Date of Patent: Jan. 4, 1994

[54] TUBULAR LINEAR MOTOR PRIMARY ELEMENT

[75] Inventors: Eiji Narumi, Tokyo; Keiichi Kohroki, Aichi, both of Japan

[73] Assignee: Otis Elevator Company, Farmington, Conn.

[21] Appl. No.: 831,727

[22] Filed: Feb. 5, 1992

[30] Foreign Application Priority Data

Feb. 5, 1991 [JP] Japan .................................. 3-13635

[51] Int. Cl.⁵ ............................................ H02K 41/02
[52] U.S. Cl. .................................. 187/112; 310/12
[58] Field of Search ...................... 187/112; 310/12-14

[56] References Cited

U.S. PATENT DOCUMENTS

| | | | |
|---|---|---|---|
| 4,335,338 | 6/1982 | Sawyer | 310/12 |
| 4,463,290 | 7/1984 | Asakawa et al. | 318/135 |
| 4,831,290 | 5/1989 | Clauss et al. | 310/12 |
| 4,995,159 | 2/1991 | Hancock et al. | 29/596 |
| 5,033,588 | 7/1991 | Nakai et al. | 187/95 |

FOREIGN PATENT DOCUMENTS

| | | | |
|---|---|---|---|
| 2111827 | 11/1971 | Fed. Rep. of Germany | 310/12 |
| 014653 | 6/1990 | Japan | 310/12 |
| 0917271 | 4/1982 | U.S.S.R. | 310/12 |
| 1410219 | 7/1988 | U.S.S.R. | 310/12 |

*Primary Examiner*—Steven L. Stephan
*Assistant Examiner*—Thomas M. Dougherty
*Attorney, Agent, or Firm*—Lloyd D. Doigan

[57] ABSTRACT

A tubular linear primary element is constructed of a plurality of core groups, each core group being constructed of a plurality of laminated comb-shaped plates, each plate having a plurality of radially aligned teeth and slots. The core groups are coupled together radially about an axis with the slots of the core groups facing each other toward the axis. The teeth of each core group are removed at an axial position along the primary into which an approximately ring-shaped reinforcing core is inserted.

5 Claims, 3 Drawing Sheets

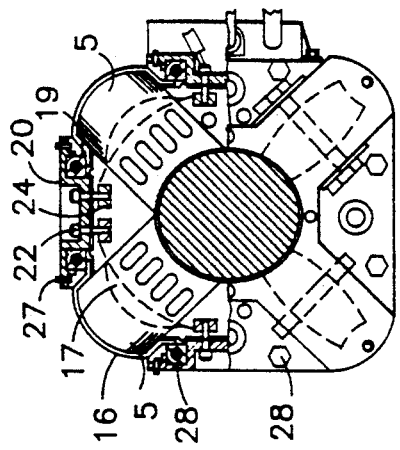
fig.1b
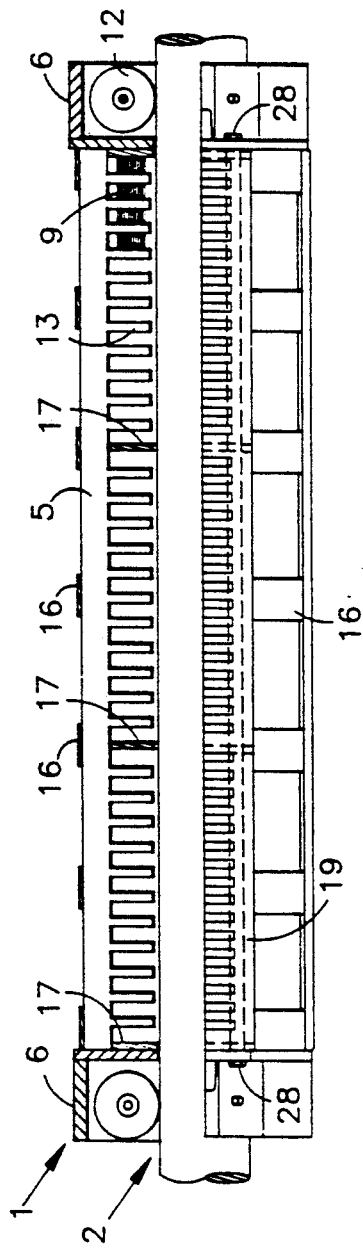
fig.1a
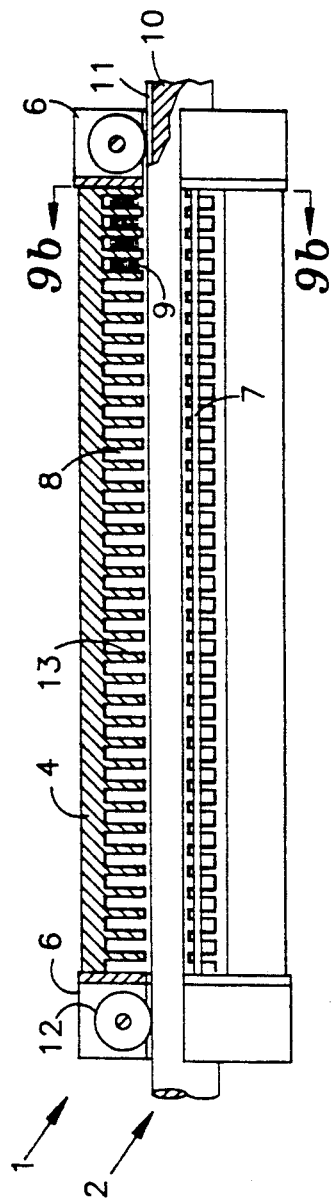
fig.9b
fig.9a ized to form a comb-shaped core plate 4 having teeth 13. As shown in FIGS. 11a and b, the core plates are laminated and welded to a side plate 14 and a back plate 15 to form an integrated core group 5. Referring to FIG. 9a, a plurality of core groups 5 are set equidistantly in a radial configuration with slots 8 facing toward the secondary element 2. A pair of end flanges (i.e., "caps") are used to clamp the core groups with the aid of a plurality of bolts 7 and nuts (not shown) to form the primary element 1. A plurality of freely rotating wheels 12 is set in the end flanges to maintain the air gap between the primary and secondary elements. In each slot 8 a coil 9 is set.

However, as the laminated core plates are welded to the side plate and back plate, curving or twisting of the core group may occur which may distort the air gap after the core groups are assembled. Further, the parallelism between the two end surfaces of the core group is degraded; hence, when fastening is carried out using the nuts, a play is formed for the shorter core group. In consideration of this problem, the following measures are taken:

a) The core groups are annealed to eliminate the curve and twist;

b) The back sheet and the side sheet are thicker and stronger so as to suppress the distortion caused by welding; and c) After welding, machining is required to correct the curve of the circle of the core group, the parallelism between the two end planes, and the desired total length of the primary element.

DISCLOSURE OF THE INVENTION

It is an object of the invention to minimize welding, annealing and machining to simplify the manufacturing process of the linear motor.

It is a further object of the invention to minimize the thickness of the back plate and the side plate thereby minimizing the cost of the materials and the weight of the motor.

It is a further object of the invention to minimize distortion of the linear motor by minimizing the welding of the motor.

According to the invention, a tubular linear primary element is constructed of a plurality of core groups, each core group being constructed of a plurality of laminated comb-shaped plates, each plate having a plurality of radially aligned teeth and slots. The core groups are coupled together radially about an axis with the slots of the core groups facing each other toward the axis. The teeth of each core group are removed at an axial position along the primary into which an approximately ring-shaped reinforcing core is inserted.

According to a feature of the invention, a clip with an approximately U-shaped cross section is about each core group at a position corresponding to the reinforcement core to hold the core groups together.

These and other objects, features, and advantages of the present invention will become more apparent in light of the following detailed description of a best mode embodiment thereof, as illustrated in the accompanying drawing.

BRIEF DESCRIPTION OF THE DRAWING

FIG. 1a is a front view of a linear motor of this invention;

FIG. 1b is a right-side view of the linear motor with a portion cut off;

FIG. 9a is a front view of a prior art linear motor;

FIG. 9b is a cross-sectional view cut along A—A of FIG. 9a;

BEST MODE FOR CARRYING OUT THE INVENTION

Referring to FIGS. 1-8, a best mode embodiment of a primary element 1 of a linear motor of this invention is shown.

Figure 2:
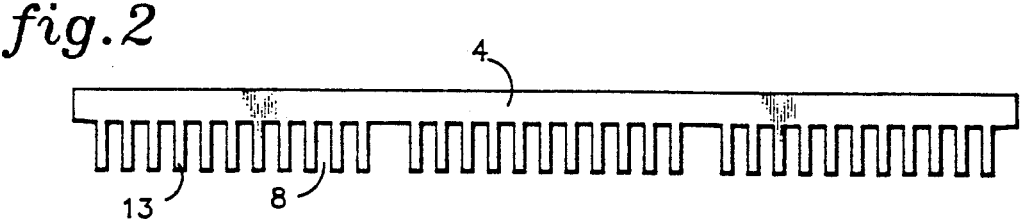
FIG. 2 is a front view of the core plate.
Figure 3A:
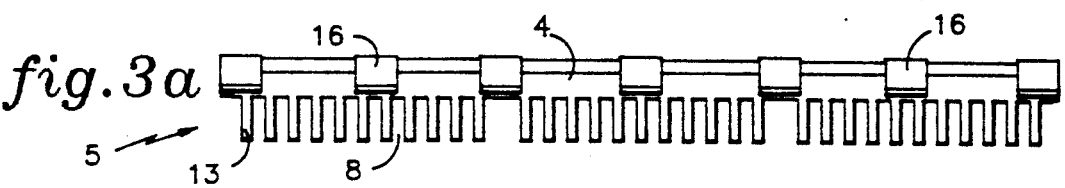
FIG. 3a is a front view of the core group.
Figure 3B:
FIG. 3b is a right side view of the core group.
Figure 4A:
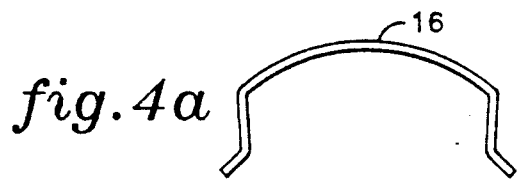
FIG. 4a is a plane view of the clip.
Figure 4B:
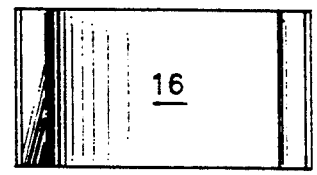
FIG. 4b is a front view of the clip.
Figure 5A:
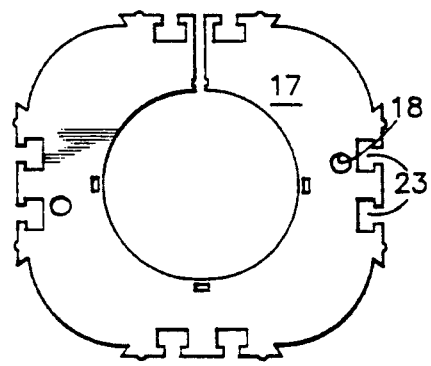
FIG. 5a is a front view of the reinforcement core.
Figure 5B:
FIG. 5b is a right side view of the reinforcement core.
Figure 6:
FIG. 6 is a configuration diagram of the square rod.

As shown in FIG. 2, core plates 4 have teeth 13 removed at two end portions and two middle portions thereof. Referring to FIGS. 3a, 3b, 4a, and 4b, clips 16, having an approximately U-shaped cross section, are used to hold the laminated core plates to form a core group 5. The clips are place in register with the removed teeth 13. Core groups 5 are set in a circular configuration about the secondary, with reinforcing plates 17 (see FIG. 5) inserted in the portions where the teeth 13 were removed, and a coil 9 is contained in each slot 8 (see FIG. 1a).

Figure 7A:
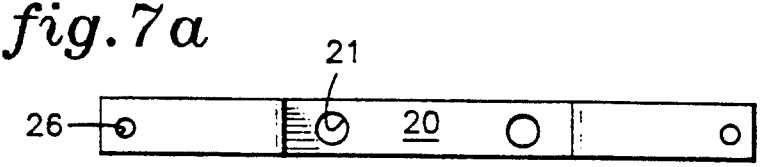
FIG. 7a is a plane view of the pressing jig.
Figure 7B:
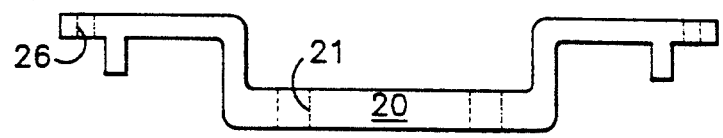
FIG. 7b is a front view of the pressing jig.
Figure 8A:
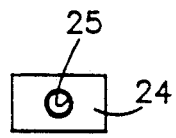
FIG. 8a is a plane view of the square nut.
Figure 8B:
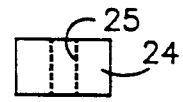
FIG. 8b is a front view of the square nut.
Figure 10A:
FIG. 10a is a left side view of the core plate.
Figure 10B:
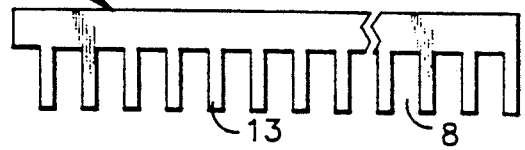
FIG. 10b is a front view of the core plate.
Figure 11B:
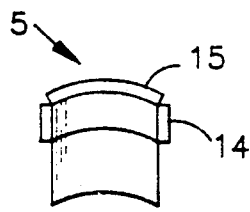
FIG. 11b is a front view of the core group.
Figure 11A:
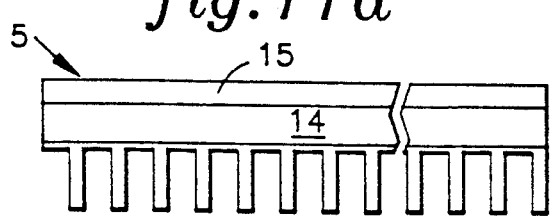
FIG. 11a is a left side view of the core group.

Referring to FIG. 1b, a clamp 20 is attached in the space between adjacent core groups 5 on the outer periphery of reinforcing plates 17. That is, as shown in FIGS. 7a and 7b, a pair of bolts 22 inserted through a pair of holes 21 on clamp 20 are screwed into threaded holes 25 of square nut 24 (see FIGS. 1b, 8a and 8b) fitted on groove 23 on reinforcement core 17. When clamp 20 is mounted, a square rod 19 with a length approximately equal to the length of core group 5 (see FIGS. 1a and 6) is set appropriately so that it can enter the inner side at the two ends of clamp 20. Bolts 28 are attached to threaded holes 19a formed in the ends of square rod 19 to the flanges 6. The rod 19 presses the two ends of clip 16 so that core group 5 is held between clip 16 and reinforcement core 17. In addition, screws 27 are set into tap holes 26 at the two ends of clamp 20 to adjust the core groups as may be necessary. By adjusting the tension of the screws and bolts, the alignment and curvature of the core groups may be adjusted.

According to this invention, the configuration is a plurality of core plates laminated together and clamped by clips. The strength of core group 5 is thus lower than that of the internally welded part containing a side plate and a back plate. However, by clamping the core groups 5 together and by utilizing reinforcing plates 17, it is possible to make correction for the curve, buckling, twisting, and warp of core group 5 and it is possible to reinforce it. As a result, a sufficiently high strength and a high precision can be guaranteed for the linear motor produced.

By screwing the clamp on the reinforcement core, the core group can be fixed between the clip and the reinforcement core. In this way, the laminated core plates are assembled into an integrated whole. As a result, although the core plates are not welded together as in the conventional scheme, it is still possible to bond together the core plates and the core groups.

As explained in the above, according to this invention, the linear motor is made of core groups which are clamped between clips and reinforcing plates via the clamp instead of using the method of welding for assembling a plurality of core plates to form the core group. As a result, there is not more distortion by the welding operation. The following are the effects that can be realized:

a. There is no need to perform annealing and finishing processing to correct the distortion caused by welding; hence, the manufacturing cost is low;

b. as there is no distortion caused by welding, it is possible to manufacture slender linear motors, which can have a high efficiency with little end effect;

c. because it is possible to manufacture linear motors with a high mechanical precision, it is possible to build a high-efficiency linear motor with a small air gap.

Although, the invention has been shown and described with respect to a best mode embodiment thereof, it should be understood by those of ordinary skill in the art, that various omission, changes and additions in the form and detail thereof may be made without departing from the spirit and scope of the invention.

We claim:

1. A primary element of an elevator tubular linear motor for use with a secondary element comprising:
   a plurality of core groups, each core group constructed of a plate having a plurality of slots and teeth, each core group contoured to be disposed radially about said secondary element, each core group having a tooth removed in register with each other core groups; and
   a reinforcing plate inserted in each core group where said tooth is removed; and
   a clamp for clamping said core groups to said reinforcing plate and for joining said core groups into a uniform whole.

2. The elevator primary element of claim 1, wherein said primary element further comprises;
   a reinforcing rod extending axially along said core groups and between said clamp and said leg for clamping said leg between said clamp and said reinforcing plate.

3. The elevator primary element of claim 1, wherein said primary element further comprises;
   a clip having:
   a body for holding each core group and,
   a leg attached to said body for cooperating with said clamp to join said core groups into a uniform whole.

4. The elevator primary element of claim 3 wherein said clip is placed axially along said primary element in register with said reinforcing plate.

5. The elevator primary element of claim 2, wherein said primary element further comprises;
   end caps disposed at either end of said core groups, said end caps including means for guiding said primary element along said secondary, said reinforcing rod being attached to each end cap.

* * * * *